UNITED STATES PATENT OFFICE.

FRIEDRICH GRAEFF, OF ALKMAAR, HOLLAND.

PRODUCING DRIED EXTRACT OF RENNET.

SPECIFICATION forming part of Letters Patent No. 384,358, dated June 12, 1888.

Application filed March 8, 1888. Serial No. 266,590. (No specimens.)

*To all whom it may concern:*

Be it known that I, FRIEDRICH GRAEFF, doctor of philosophy, a subject of the Emperor of Germany, and residing at Alkmaar, in the Kingdom of Holland, have invented a new and useful Improvement in the Process of Producing Dry Ferment of Rennet, whereof the following is a specification.

My invention relates to the production of dry ferment of rennet from extract of the rennet, and its object is to completely separate out the ferment from the liquid extract and to produce it in dry state.

In the preparation of the dry ferment from extract of the rennet, usually carried out by precipitation from the liquid extract by means of table salt, it has heretofore not been possible to obtain the whole quantity of the ferment, inasmuch as the remaining liquid always retains a considerable portion of the same. In order to obviate this inconvenience, a pure and clear extract of rennet, not containing above ten per cent. of table salt, is evaporated to dryness *in vacuo* at a temperature not exceeding 40° centigrade. The product is reduced to powder, which is thereupon washed with saturated solution of table-salt in view of removing the coloring-matter present, and finally it is dried again. It is advantageous to employ in the process extracts of high fermentative power which are free from preserving substances, such as boracic acid and thymol.

The product obtained, as described, is a powder which is completely soluble in water. For rendering the same a marketable article, it is mixed with a suitable quantity of an innocuous salt—for instance, with table-salt.

I claim as my invention—

The process of producing dry ferment of rennet, which consists in evaporating liquid extract of rennet to dryness *in vacuo* at a temperature not exceeding 40° centigrade, comminuting the product, washing the same with saturated solution of table-salt, and drying it again, substantially as and for the purpose described.

In testimony whereof I have hereunto set my hand in the presence of two subscribing witnesses.

FRIEDRICH GRAEFF.

Witnesses:
  B. ROI,
  OTTO HAUER.